US009720887B2

(12) United States Patent
Pappu et al.

(10) Patent No.: US 9,720,887 B2
(45) Date of Patent: Aug. 1, 2017

(54) MOBILE-TO-TV DEEPLINKING

(71) Applicant: Clasp.tv, New York, NY (US)

(72) Inventors: Prashanth Pappu, New York, NY (US); Gary Karl Kumfert, Pleasanton, CA (US); Daniel Rubenstein, New York, NY (US)

(73) Assignee: Clasp.tv, New York, NY (US)

( * ) Notice: Subject to any disclaimer, the term of this patent is extended or adjusted under 35 U.S.C. 154(b) by 80 days.

(21) Appl. No.: 14/720,484

(22) Filed: May 22, 2015

(65) Prior Publication Data

US 2015/0339274 A1 Nov. 26, 2015

Related U.S. Application Data

(60) Provisional application No. 62/002,637, filed on May 23, 2014.

(51) Int. Cl.
| | |
|---|---|
| *G06F 17/00* | (2006.01) |
| *G06F 17/22* | (2006.01) |
| *H04L 29/08* | (2006.01) |
| *H04N 21/41* | (2011.01) |
| *H04N 21/414* | (2011.01) |

(Continued)

(52) U.S. Cl.
CPC .......... *G06F 17/2235* (2013.01); *H04L 67/32* (2013.01); *H04N 21/4122* (2013.01); *H04N 21/4126* (2013.01); *H04N 21/41407* (2013.01); *H04N 21/435* (2013.01); *H04N 21/472* (2013.01); *G06F 17/2247* (2013.01); *G06F 17/30864* (2013.01); *G06F 17/30867* (2013.01);

(Continued)

(58) Field of Classification Search
CPC ................ G06Q 30/02; G06F 17/2235; G06F 17/30864; G06F 17/30905; G06F 17/2247; G06F 17/30867
USPC .......................... 715/200–210, 229, 719, 749
See application file for complete search history.

(56) References Cited

U.S. PATENT DOCUMENTS

| | | | |
|---|---|---|---|
| 9,047,259 B1 * | 6/2015 | Ho ................... | G06F 17/30882 |
| 2002/0124093 A1 | 9/2002 | Nakai | |

(Continued)

OTHER PUBLICATIONS

International Search Report issued in corresponding application No. PCT/US15/32253, filed May 22, 2015 (2 pages) (Aug. 21, 2015).

(Continued)

*Primary Examiner* — Quoc A Tran
(74) *Attorney, Agent, or Firm* — Fish & Richardson P.C.

(57) ABSTRACT

System and methods for performing a particular action on a second device directed from a first device. In some implementations, the methods include receiving, from a first device, a hyperlink corresponding to associated content, and a user input on the first device enabling the hyperlink; in response to receiving the user input on the first device enabling the hyperlink, parsing the received hyperlink to extract information embedded in the text of the hyperlink; determining, based at least on the extracted information embedded in the text of the hyperlink, and the associated content corresponding to the hyperlink, a particular action to be performed on a second device, wherein the particular action is configured to be viewable to a user providing the user input on the first device; and providing, to the second device, an instruction to perform the particular action on the second device.

57 Claims, 9 Drawing Sheets

(51) Int. Cl.
*H04N 21/435* (2011.01)
*H04N 21/472* (2011.01)
*G06Q 30/02* (2012.01)
*G06F 17/30* (2006.01)

(52) U.S. Cl.
CPC ....... *G06F 17/30905* (2013.01); *G06Q 30/02* (2013.01)

(56) References Cited

U.S. PATENT DOCUMENTS

| | | |
|---|---|---|
| 2009/0147259 A1 | 6/2009 | Peak et al. |
| 2009/0228919 A1 | 9/2009 | Zott et al. |
| 2010/0319040 A1 | 12/2010 | Diaz Perez |
| 2012/0030366 A1 | 2/2012 | Collart et al. |
| 2012/0132701 A1 | 5/2012 | Nakagawa et al. |
| 2012/0208510 A1 | 8/2012 | Engstrom et al. |
| 2013/0014136 A1* | 1/2013 | Bhatia .................. H04N 21/252 725/9 |
| 2014/0033040 A1 | 1/2014 | Thomas et al. |
| 2014/0267931 A1* | 9/2014 | Gilson ................. H04N 5/4403 348/734 |

OTHER PUBLICATIONS

International Preliminary Report on Patentability for Int. App. No. PCT/US2015/32253, dated Oct. 31, 2016 (7 pages).

\* cited by examiner

Mobile-to-TV Deeplink
http://vizbee.tv/app1/video1 — 410

| Display Device App | App Name | Video Params | App Store Protocol |
|---|---|---|---|
| Roku | MyApp_Roku | v=video1&t=0 | ECP |
| Chromecast | MyApp_CC | v=video1 | DIAL |
| FireTV | MyApp_FireTV | v=video1&metadata=show1 | DIAL-Custom |
| Samsung TV | MyApp_Samsung | v=video1 | MainTV/Agent |
| LG TV | MyApp_LG | v=video1 | UDAP |
| Panasonic TV | MyApp_Panasonic | v=video1 | Network Control Service |

FIG. 4

MOBILE-TO-TV DEEPLINKING

CROSS-REFERENCE TO RELATED APPLICATIONS

This application claims priority to U.S. Application Ser. No. 62/002,637, filed on May 23, 2014.

FIELD

The present disclosure relates to content streaming.

BACKGROUND

In content streaming, a server may execute an application and stream video to different client devices such as mobile devices and televisions. The user may interact with the application based on the video streamed to the client device. Applications may vary for different client devices due to performance requirements for each type of client device. As a result, users may need to learn different user interfaces, controls and steps to stream videos on different devices. Applications for different client devices may also be incompatible with each other, preventing the user from playing video from a single source across multiple client devices.

SUMMARY

In general, one of the innovative aspects of this disclosure enables a content publisher to encapsulate a multimedia experience into a single hyperlink, referred to as a mobile-to-tv deeplink, which may be enabled to perform a particular action on a display device. The hyperlink may be enabled by a user input that may include, but is not limited to, a single touch input or "one click" on the screen of a mobile device such as, for example, a smart phone, a tablet or a laptop computer. In some instances, the user input may also include a "second click" to select a display device to display content associated with the hyperlink from a list of candidate devices.

In some instances, the hyperlink may be shared by existing distribution mechanisms such as social networks, email, mobile messaging applications, and other content sharing platforms. In some instances, the hyperlink may be embedded in various forms of multimedia such as photos or video clips.

The hyperlink may be compatible with all requirements of video publishers with respect to high quality video encoding and video encryption. For example, the hyperlink may be configured to operate on the control plane of a cloud network that connects a mobile device and a display device. For example, the hyperlink may be configured to operate purely on the control plane of a video distribution network and automate sequences of actions required to initiate streaming video files without altering the data plane. For instance, the hyperlink may be configured to operate where the physical transfer of content and any related constraints such as security, monitoring, content quality, can be adhered to as if the transfer of content was initiated from the display device directly.

Implementations of the mobile-to-tv deeplink may be based on the configuration of a set of link action parameters. The link action parameters may include methods that may be used to associate content to the hyperlink. In some instances, the link action parameters may be static parameters included in the text of the hyperlink that provide descriptions, attributes, and other information about the associated content to the mobile device receiving the hyperlink prior to receiving a user input that enables the hyperlink. For example, the static parameters in the hyperlink may transmit, to the mobile device receiving the hyperlink, the content rating of the content associated with the hyperlink (e.g., "R" rated content), the genre, metadata that identifies the associated content, information about discounts, special offers (e.g., season passes), or special codes to activate special features related to the associated content.

In some instances, the set of actions to be performed in response to the user input may be predetermined when the hyperlink is constructed. For example, if the hyperlink is received in an email, the static parameters may be configured prior to a user enabling the hyperlink in the email. In some instances, the static parameters include information about the source and playback of the associated content or the hyperlink. For example, the static parameters may include user authentication information (e.g., username and password), an instruction that a video file may only be played using the Netflix app, an indication that the hyperlink was originally placed on a Facebook page, or that a particular using enabling the hyperlink should receive a credit every time the hyperlink is enabled.

In some instances, the link action parameters may be dynamic parameters that may direct the hyperlink to an intermediate device, such as a proxy, an intermediate server, or another mobile device, which may interpret the hyperlink and determine a set of context-specific actions to be performed based on attributes of the intermediate device. In such instances, the set of actions to be performed may be determined by context data associated with the intermediate device.

In some instances, the link action parameters may be contextual parameters that are determined based on the context data associated with the user input when the hyperlink is enabled. For example, such context data may include attributes of the local network connected to the mobile device where the hyperlink is presented, available display devices connected to the local network with the mobile device, the geographical location of the devices on the local network, among others.

The configurations of the set of link action parameters may be used in various implementations of the mobile-to-tv deeplink. In some implementations, the hyperlink may be to direct associated content stored on a server to stream on display device such that clicking on the hyperlink initiates video streaming process without any user input or interaction on the display device.

In some implementations, a network entity that processes the hyperlink, for example, a server computer, may use the hyperlink to detect a list of compatible display devices that are connected to the mobile device over a local area network. In such implementations, the system may indicate the compatible display devices based on the hardware configurations of the display device and the attributes of the content associated with the hyperlink, for example, processing speed of the display device, video resolution of the screen of the display device, and compatible video codec of the application running on the display device.

In some implementations, a content publisher may display the hyperlink over a distribution platform, for example, a social media network, for advertising and promotional schemes. For example, the hyperlink may be placed on electronic advertisements published on webpages or applications and remain active only for the first hundred users that click the hyperlink. In another example, the content publisher may offer incentives for the first hundred users that click on the hyperlink during an early preview of a new show. In other examples, the hyperlink may be active for fixed time durations such as during an early preview of a new movie.

In some implementations, a network entity that processes the hyperlink may use the hyperlink as an authentication method to enable a user to access content on a display device from a mobile device. For example, the hyperlink may include a user's authentication credentials and enable the user to access subscription-based applications such as sports applications or premium video content on the display device.

In some implementations, a network entity that processes the hyperlink may use the hyperlink to control access to viewable content on the display device. For example, the hyperlink may include adjustable settings limiting when a particular application may be performed on the display device. In such examples, the settings may be controlled by either a content provider to provide access to distributed content or a user to create user-defined settings.

Aspects of the various implementations described previously may be combined in a single implementation embodying the subject matter of this disclosure.

In some aspects, the subject matter described in this disclosure may be embodied in computer-implemented methods including: receiving, from a first device, (i) a hyperlink corresponding to associated content, and (ii) a user input on the first device enabling the hyperlink; in response to receiving the user input on the first device enabling the hyperlink, parsing the received hyperlink to extract information embedded in the text of the hyperlink; determining, based at least on (i) the extracted information embedded in the text of the hyperlink, and (ii) the associated content corresponding to the hyperlink, a particular action to be performed on a second device, where the particular action is configured to (i) be viewable to a user providing the user input on the first device, and (ii) operate in a control plane without interfering with data plane traffic; and providing, to the second device, an instruction to perform the particular action on the second device.

Other versions include corresponding systems, apparatus, and computer programs, configured to perform the actions of the methods encoded on computer storage devices.

These and other versions may each optionally include one or more of the following features. For instance, in some implementations, the first device is a mobile computing device and the second device is a display device. In some implementations, the methods include transmitting, to a server computer, a request including the extracted information embedded in the text of the hyperlink.

In some implementations, operating in the control plane may include performing a particular action, on a cloud network, configured to operate where the physical transfer of the associated content and any related constraints such as security, monitoring, content quality, can be adhered to as if transferring the content associated was initiated from the second device without the first device.

In some implementations, performing the particular action to be performed on the second device may include: displaying the associated content on the screen of the second device, or installing software on the second device that is necessary to display the associated content on the screen of the second device. In some implementations, the methods may include, after installing software on the second device to display the associated content on the display of the second device, displaying the associated content on the screen of the second device.

In some implementations, the text of the hyperlink may include an instruction to either (i) direct the particular action to be performed on the second device, or (ii) restrict the particular action to be performed on the second device. In some instances, the instruction is generated in response to receiving the user input enabling the hyperlink, where the instruction initiates an intermediate particular action performed before the particular action to be performed that either (i) directs the particular action to be performed on the second device, or (ii) restricts the particular action to be performed on the second device. In some instances, the intermediate action is executed on a server connected to a wide area network, the intermediate action is executed on the first device, the first device and the second device are both observable to the user, where the first device and the second device are connected over a wireless or wired local area network, the first device and the second device are connected to the Internet, the second device remote from the first device.

In some implementations, the methods include restricting access to performing the particular action based at least on the instruction. In some implementations, restricting access to performing the particular action may include: providing a method of authentication for a user providing an input to enable the hyperlink, designating the second device as a permitted device that may perform the particular action to be performed, designating a time period only when the particular action to be performed is performed, limiting the number of times the particular action to be performed is performed, designating the first device as a permitted device that may transmit the instruction to the second device, or designating a user of the first device as a permitted user that may transmit the instruction to the second device.

In some implementations, the hyperlink may include promotional information from a content publisher, the promotional information containing at least one of a content discount, a share-with-friends feature, or an access to other links with additional features. In some implementations, the hyperlink may be: displayed to the user in at least one of a document, an online advertisement, or a paper advertisement, embedded in an email, embedded in a webpage, embedded in a mobile application, or displayed to the user as a bar code.

The details of one or more implementations of the subject matter described in this disclosure are set forth in the accompanying drawings and the description below. Other potential features, aspects, and advantages of the subject matter will become apparent from the description, the drawings, and the claims.

BRIEF DESCRIPTION OF THE DRAWINGS

FIG. 4 illustrates example mobile and display applications used to display media content through a hyperlink.

In the drawings, like reference numbers represent corresponding parts throughout.

DETAILED DESCRIPTION

Figure 1:
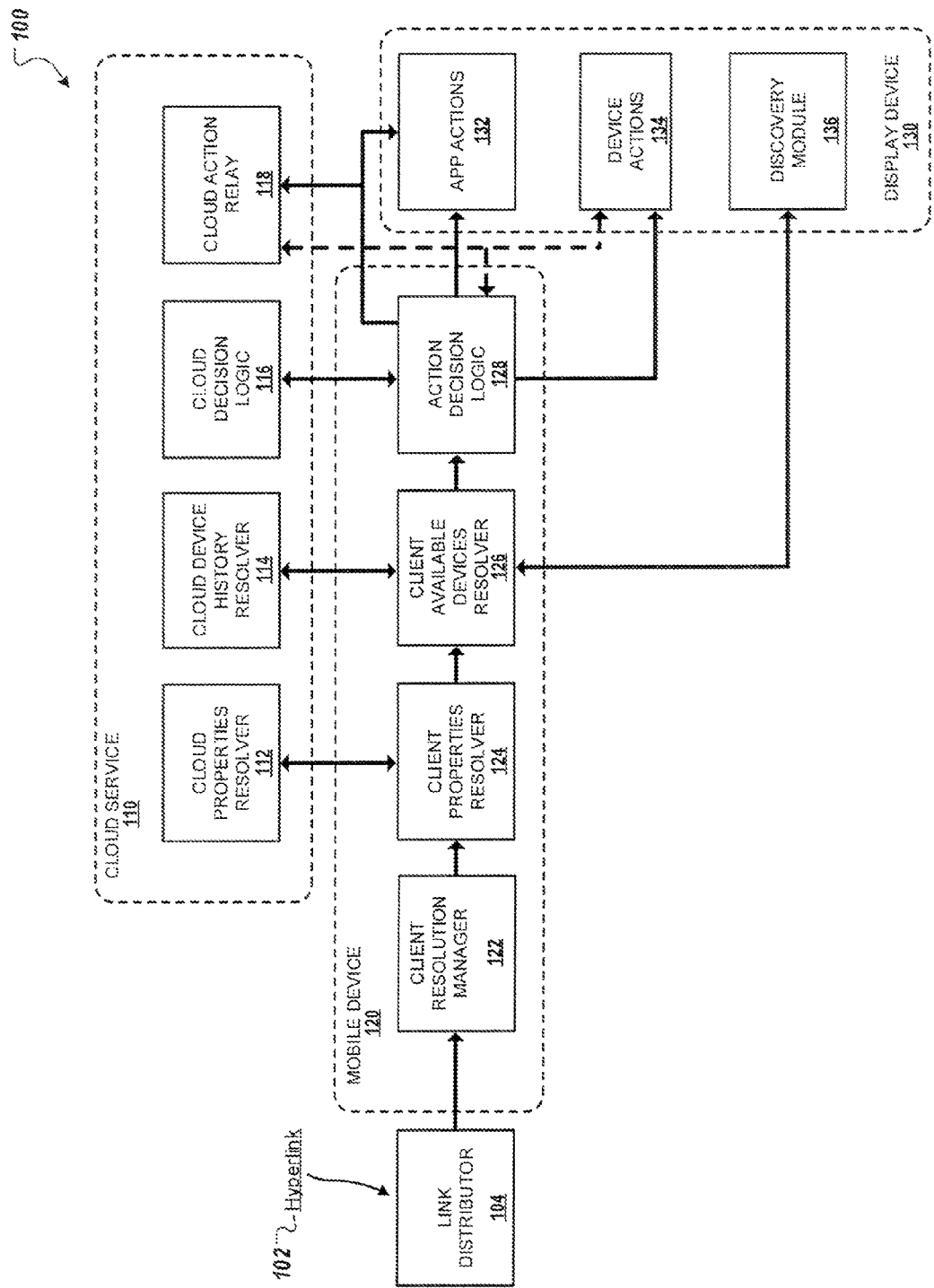
FIG. 1 illustrates an example of system for mobile-to-tv deeplinking.

Current streaming techniques for users to view media content on display devices involve disparate manual steps to launch videos. For example, in many instances, the user must turn on the display device, turn on an internet connected content streaming device, switch the input of the display device to connected content streaming device, search for the appropriate display application on the display device in the display device app store, install the display application, launch the video application, browse or search for the media content to be viewed, and then play the media content. In addition, these steps are vastly different between different brands of display device such as Samsung, LG, Vizio, or others. For example, each manufacturer may have different application ecosystems, remote interfaces, user interfaces, or content browsing requirements.

Another limitation is the disparity between content distribution and content consumption. For example, users are using social networks such as Facebook, Twitter, Vine, and messaging platforms such as email, messaging applications, and search engines to increasingly promote, share, and distribute video content that may predominantly operate on mobile devices.

Although mobile applications easily enable referral and sharing of video content, display devices have been traditionally been disconnected from content distribution. For example, a user who discovers a video on a mobile application may share the link to a friend through a mobile application, but may not easily view the video on the display device. Since there are limited video applications supported on display applications, and poor integration between mobile applications and display applications, many users that discover content through mobile applications are forced to execute a sequence of manual steps to view the content on their display devices.

Access to video content on display devices also requires users to adhere to various access control policies of content publishers. For example, a user may be required to have their own login and password to access such content. This requirement may be relaxed by content publishers that are focused on promoting content to users. For instance, a user may receive complementary access to particular content if the user has access to discount codes obtained by a link that is used to view the content. In another instance, a user may be allowed to share access with one or more users to view reoccurring content such as a television show. However, such content promotion schemes are currently limited because of the disconnect between content link promotion and the sharing and viewing of such content on display devices.

In addition, a key constraint of content publishers is that the content to be displayed may not be re-encoded, decrypted, re-routed, or cached to maintain security of the original content and preserve the content quality. This requires that any content distribution platform must operate purely in the "control-plane" of a publisher's distribution network such that it can exchange control messages, authenticate content transfers without interfering with the "data-plane" where content transfers actually take place.

Accordingly, techniques and systems are described to enable a content publisher to encapsulate a multimedia experience into a single hyperlink, referred to as a mobile-to-tv deeplink, which may be enabled to perform a particular action on a display device. In some instances, the hyperlink may be shared by existing distribution mechanisms such as social networks, email, mobile messaging applications, and other content sharing platforms. In some instances, the hyperlink may be embedded in various forms of multimedia such as photos or video clips. The hyperlink may be enabled by a user input that may include, but is not limited to, a touch input or a "click" on the screen of a mobile device such as, for example, a smart phone, a tablet or a laptop computer.

As used by this disclosure, a "mobile device" (or "mobile computing device") may be any handheld electronic device with a display screen to accept user input. For example, a "mobile device" may include, but is not limited to, smartphones, tablet computer, laptop computers, wearable devices, or any other portable electronic devices. A "display device" may be any electronic visual displays for presentation of information. For example, a "display device" may include, but is not limited to, televisions, computer monitors, or other types of output devices.

In one implementation, the hyperlink may be created deploying display applications on any display device. For example, the hyperlink may be embedded on a web page accessed on a mobile device that describes the display application and has universal ratings and comments about the viewing experience on any display device. In such implementations, a user may select the hyperlink, by either "clicking" the hyperlink or by providing a touch input over the hyperlink to trigger an installation of the display application on various display devices. For example, when a user within a house clicks on the hyperlink in a living room with a TV connected to a Roku, a corresponding installation of the Roku app for the smart TV may take place. In another example, if the user is in a living room with a Samsung TV, a corresponding installation of a Samsung TV app may take place.

In another implementation, the hyperlink may be embedded in content included within a "post" of a social network. For example, the post may contain short ten second video previews that a user may click to trigger a viewing of the full video on a display device.

In another implementation, a content publisher may use the hyperlink to advertise a new show or movie with various distribution schemes that encourage a user to share the link. For example, a content publisher may use the hyperlink for promotional purposes by offering the first hundred users that access the hyperlink to receive a discounted price for purchasing the content. In another example, the content may be free to view for a certain trial period (e.g., one month). In such examples, once the hyperlink is created, the hyperlink may track usage dynamically and enable any user to trigger to video to display on a TV with user-specified parameters.

In another implementation, the hyperlink may be used to control content access sharing. For example, a user may have access to view content from a content publisher. In this example, the content publisher may enable an access control through the hyperlink to allow the user to share access control with a specified number of other users. For instance, a second user may simply click on the hyperlink on a mobile device and trigger content display on a display device using the access control of the first user.

FIG. 1 illustrates an example system 100 for mobile-to-tv deeplinking. Briefly, the system 100 may include a link distributor 104, cloud service 110, a mobile device 120, and a display device 130. The cloud service 110 may include a cloud properties resolver 112, a cloud device history resolver 114, a cloud design decision logic 116, and a cloud action relay 118. The mobile device 120 may include a client resolution manager 122, a client properties manager 124, a client available devices resolver 126, and action decision logic 128. The display device 130 may include app actions 132, device actions 134, and discovery module 136.

Although the cloud service 110, as represented in an embodiment in FIG. 1, may be separate from the mobile device 120 and the display device 130, in some implementations, the cloud service may be placed in a local area network that connects the mobile device 120 and the display device 130 (e.g., home network), or on the mobile device 120 (e.g., on a mobile application), or on the display device (e.g., on a display application). For clarity, the embodiment represented in FIG. 1 is discussed below.

In more detail, the general form of the hyperlink 102 may be "PROTCOL://SERVER-ID/RESOLVER-ID." The "PROTOCOL" may describe the protocol that should be used to interpret the information embedded within the hyperlink 102. For example, possible protocols may include, but is not limited to, hypertext transfer protocol (HTTP) or HTTP over SSL (HTTPS). The "SERVER-ID" may be some identifier that identifies a network entity that may process the remaining ID. The server ID may be a web address (e.g., vizbee.tv) that identifies the location of content associated with the hyperlink in the network to be processed by the network entity. The web address may be an IP address (e.g., 184.168.221.34), or a host name (e.g., vizbee.tv), which may be resolved via standard network protocols such as DNS. The "RESOLVER-ID" may be a unique, pseudo-randomly generated ASCII (American Standard Code for Information Interchange) text string (e.g., "7yb3UT"), which the networked entity may map to a specific type of action such as playing a particular movie during a specified date range for users with proper authentication credentials. The RESOLVER-ID may map the text string in the hyperlink to a particular action in a database on the network entity by the pseudo-random resolver ID.

The hyperlink 102 may be enabled by a user input on a mobile device including, for example, a "one click" using a mouse or a touch input over the text of the hyperlink. When the hyperlink is enabled, the protocol in the link may be used to contact the networked entity indicated by the server ID, and the resolver ID may be sent to the network entity. Additional parameters may also be transmitted to the network entity. For example, the following hyperlink:
"https://vizbee.tv/7yb3UT?user=FredFlinstone&sharedAccess=family." represents a user, FredFlinstone, that sends the link represented above, along with required authentication information setting "family" to enable the content specified at the web address "vizbee.tv" and a resolver ID of "7yb3UT" to the network entity. The parameters may be encrypted when transmitted from the mobile device to the network entity but are represented here as unencrypted for clarity.

The link distributor 104 may be any type of distribution platform that transmits hyperlink 102 to the mobile device 120. For example, the link distributor 104 may initially transmit the hyperlink 102 to the mobile device 120 to perform any necessary deep linking. The client resolution manager 122 may be a mobile application on the mobile device 120 that receives the hyperlink 102 from the link distributor 104. The client resolution manager 122 may be embedded within a web browser, or a native application on the mobile device 120. In some implementations where the client resolution manager 122 is a native application on the mobile device 120, the hyperlink 102 may be received by the client resolution manager 122 using common mobile deep linking methods that contain all information necessary to point the hyperlink 102 to a particular item or destination.

The client properties resolver 124 of the mobile device 120 and the cloud properties resolver of the cloud service 110 may exchange communications to determine the properties associated with the hyperlink 102. For example, the client properties resolvers 124 and 112 may assess whether the properties of the hyperlink 102 are static or dynamic. The properties of the hyperlink 102 may include, but are not limited to, media identifiers that identify the specific media file, media metadata, or playlist that may be encoded in the URL of the hyperlink 102, list of available display devices that may be used to perform an action on based on enabling the hyperlink 102, media promotion properties that may include specific discount codes, preview time period or audience limit constraints that are evaluated dynamically as the link is triggered by different users, or video access control properties that may include access control credentials that may be embedded into the link.

The client available devices resolver 126 may identify candidate display devices such as the display device 130 that may be connected to the mobile device 120 over a local area network. The client available devices resolver 126 may initially scan the local area network using various network discovery techniques to determine if there may be any compatible display devices on the network. For example, the client available devices resolver 126 may exchange communications with the discovery module 136 of the display device 130 to determine if the display device 130 may be an appropriate device to display the associated content of the hyperlink 102. The discovery module 136 may be available by the manufacturer of the display device 130 and may include, but is not limited to protocols such as simple service delivery protocol (SSDP), multicast DNS (mDNS), or proprietary communication schedules over various network communication mediums such as Wi-Fi, Bluetooth or infrared (IR).

The client available devices resolver 126 may include a discovery table that may include mapping of the discovery protocols supported by each of the display devices 130. The discovery table, as represented more specifically in FIG. 4, may be used to determine the combination of discovery protocols that are compatible with the associated content embedded within the hyperlink. In some implementations, the client available devices resolver may designate some of display devices 130 as "accepted display devices," which may represent the display devices connected over the local network that may be capable of displaying the associated content embedded within the hyperlink 102.

The client available devices resolver 126 may also exchange communications with the cloud device history resolver 114 of the cloud service 110. The cloud device history resolver 114 may be a history log of previously connected display devices 130 over the local area network of the mobile device 120. In some instances, the cloud device history resolver 114 may categorize the display devices 130 connected over different local area networks. In these instances, the client available devices resolver 126 may present a list of display devices 130 to the mobile device 120 based on retrieving a list of previously connected display devices 230 over the current local area network from the cloud device history resolver 114.

The action decision logic 128 and the cloud decision logic 116 may individually or collectively function in parallel to integrate available information about the associated content of the hyperlink 102 with information obtained by the client properties resolver 124 and the cloud properties resolver 112 and initiate processes to perform particular actions on the display device 130. For example, the available information may include, but is not limited to, the rights holder of the associated content, device attributes of the mobile device 120, or device attributes of the display device 130. In some instances, the cloud decision logic 116 or the action decision logic 128 may add or remove candidate display devices 130 based on determining that the particular display devices 130 are unable to display the associated content of the hyperlink 102. In response, the mobile device 120 may offer list of accepted display devices to a user to select a display device 130 as described previously.

In other instances, the action decision logic 128 or the cloud decision logic 116 may modify or compound the triggered action to be performed when the hyperlink 102 is activated. For example, the action decision logic 128 or the cloud decision logic 116 may initially determine if the triggered actions satisfy any number of user preferences, technical requirements, or business requirements prior to modifying the default triggered action based on the hyperlink 102. The action decision logic 128 may then transmit a set of app actions 132 or device actions 134 to be performed on the display device 130.

The device actions 134 may be a set of actions that may be stored and performed on the display device 130. For example, device actions 134 may include installing a new display application on the display device 130, adjusting the display or sound settings of the display device 130, playing media content through a web-based interface on the display device 130, or any other action outside those performed by individual display applications on the display device 130. The particular device actions 134 determined by the action decision logic 128 may be based on a device action table that may include mappings for app installation protocols, app store identification numbers, or protocol parameters, as represented more specifically in FIG. 4.

The app actions 132 may be a sequence of actions that may be stored on the display device 130 and selected by the action decision logic 128 to perform on the display application installed on the display device 130. The app actions 132 may not be unique to the particular display device 130 but may include computer-implemented protocols that enable the display application of the display device 130 to perform an in-app action on the display device 130. For example, the app actions 132 may include enabling a display application of the display device 130 to display associated content on the display device 130. In other examples, the app actions 132 may include a messaging suite that enables the display application of the display device 130 to display messages that may be received on the mobile device 120.

In some instances, the app actions 132 may exchange communications with the cloud action relay 118 to assist in establishing a connection with the display device 130. In these instances, the cloud action relay 118 may be used due to technical limitations of the display device 130. In such instances, the cloud action relay 118 may function as a proxy between the mobile device 120 and the display device 130. For example, the cloud action relay 118 may be used if the display device 130 is behind a network address translation (NAT), or there are connection establishment issues when connecting the mobile device 120 to the display device 130.

Figure 2:
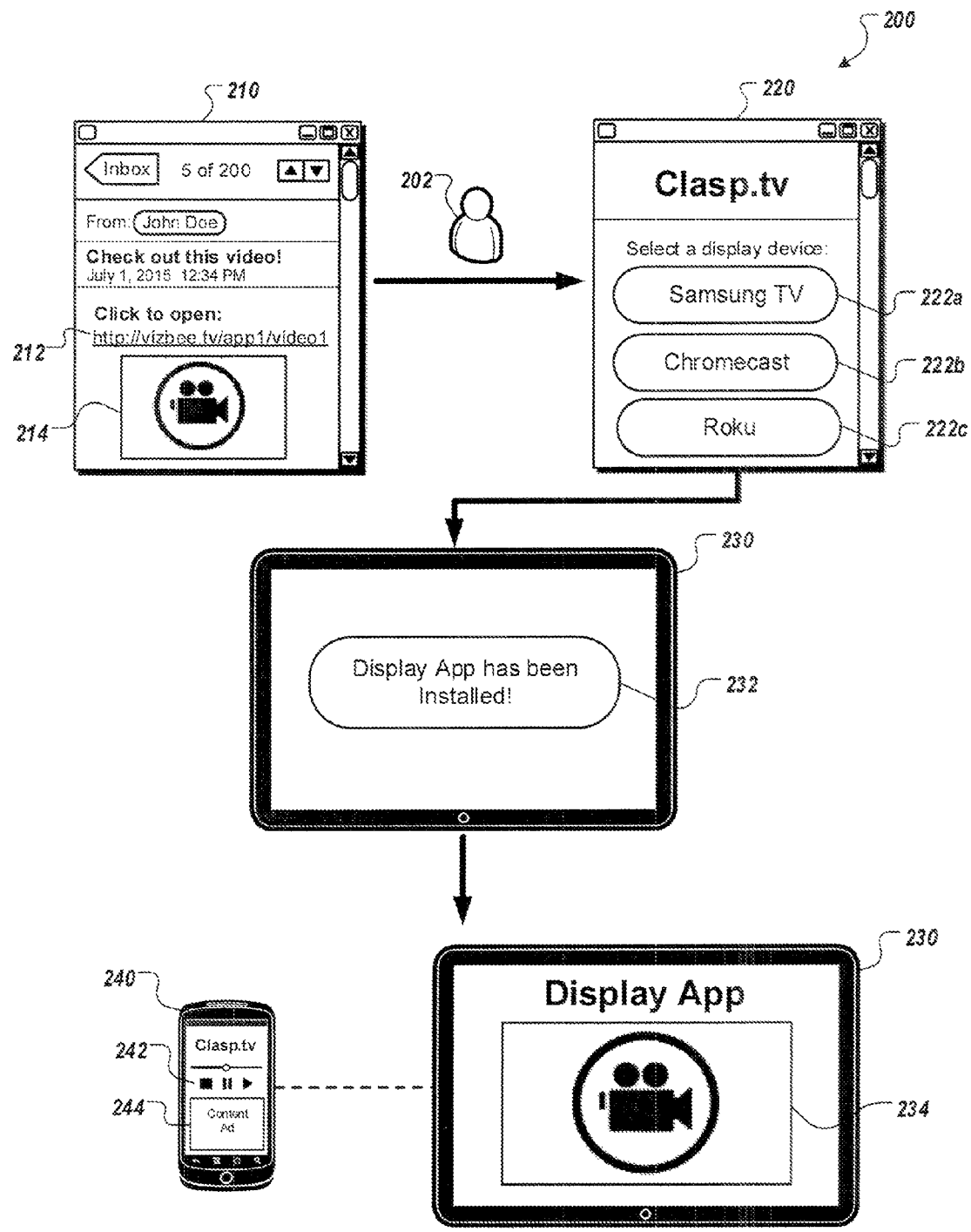
FIG. 2 illustrates an example process for automatic content streaming using a hyperlink.

FIG. 2 illustrates an example process for automatic content streaming using a hyperlink. Briefly, the user 202 may receive an email 210 with a hyperlink 212 with corresponding media content 214. The user 202 may click on the hyperlink 212 to activate the hyperlink and be directed to a mobile application 220 that provides a list of candidate display device buttons 222a-222c. The user may then select one of the candidate device display buttons, which may initiate a backend process to install a display application on the selected display device 130. A user may then receive a notification 232 on the display device 230 that confirms that the display application has been installed on the display device 230. The user 202 may then view the content 234 associated with the hyperlink 212 on the display device 230.

In more detail, the hyperlink 212 may correspond to one single video that may be played on any multimedia device. The hyperlink 212 may be a hypertext transfer protocol (HTTP) link that may be shared on any distribution platform such as social network posts, webpages, mobile applications, banner advertisements, mobile advertisements, and emails. The user 202 may access the hyperlink 212 on any mobile device such as a smartphone, a tablet, a laptop, or a PDA that is connected to a network. The user 202 may enable the hyperlink 212 using a user input that may include, but is not limited to, a single touch input or "one click" over the hyperlink 212. In some instances, after the user 202 enables the hyperlink 212, the mobile application 220 may be launched on the mobile device. In some examples, the hyperlink 212 may be embedded within a social media post that include a short preview of a video and associates the full video to link location of the hyperlink 212.

The mobile application 220 may be any mobile application on the mobile device used to activate the hyperlink 212. In some implementations, the mobile application 220 is integrated with a hyperlink software development kit (SDK) that allows the mobile application 220 to control display devices 230 connected to the same network as the mobile device. For example, the hyperlink SDK may include a device discovery component that implements various device discovery protocols supported by connected display devices 230 such as the simple service discovery protocol (SSDP) that is supported by display devices 230 that implement universal plug and play (UPNP), digital living network alliance (DLNA), discovery and launch (DIAL) and other communication standards. The hyperlink SDK may also implement device-specific protocols for video playback on various other display applications on connected display devices 230. For example, the hyperlink SDK may intelligently select the appropriate protocol for connected display devices 230 by initially determining the attributes of the connected display devices 230 and send launch parameters to allow playback of video content on the display device 230.

In some implementations, the mobile application 220 utilizes a cloud-based service to determine candidate display devices 230 connected to the same network as the mobile device. For instance, after the user 202 enables the hyperlink 212, the mobile application 220 may initially use the integrated hyperlink SDK to determine the available display devices 230 connected to the network. The mobile application 220 may then transmit information about the display device 230 to a server computer connected over the cloud-based service. The service may then index the display device 230 information to device information tables as represented in FIG. 4 and determine the candidate display devices 230 that are connected to the local network.

For instance, if the mobile application determines there are multiple connected candidate display devices 230, the mobile application may then present a list of connected candidate display devices 230 through a user interface to allow the user 202 to select a candidate display device 230. For example, as represented in FIG. 2, the mobile application 220 may display device buttons 222*a*, 222*b*, and 222*c*, which correspond to determining that "Samsung TV," "Chromecast," and "Roku" are connected to the local network of the mobile device. The user 202 may then select the display device 230 to user by providing an input indicating which display device 230 to direct the video content to.

In some implementations, in response to the user 202 submitting an input indicating a display device 230, the mobile application 220 may send a subsequent transmission to the cloud-based service indicating that one of the candidate display devices 230 has been selected by the user. The server computer may then determine, based on the attributes of the selected display device 230, a suitable display application on the selected display device 230 that is capable of streaming the video content associated with the hyperlink 212.

The server computer may then determine whether the display application is installed on the display device 230. In some instances, if the server computer determines that the display application is not installed on the display device 230, the server computer may initiate a computer-implemented protocol to download and install the display application on the display device 230. For example, after the display device 230 has downloaded and installed the display application, the server computer may then transmit an instruction to the display device 230 to display a notification 232 on the interface of the display device 230 when the display application has been installed as represented in FIG. 2.

In some implementations, the display application installation protocol is initiated by the mobile application 220 over a local network. In such implementations, the mobile application 220 initially receives a data transmission from the sever computer, using the cloud-based service, that may include display application files and device-specific installation instructions. The mobile application 220 may then transmit an instruction including the application files to the display device 230. In response receiving the instruction, the display device 230 may then download and install the display application. In other implementations, the installation process may be initiated by the hyperlink SDK that is integrated into the mobile application 220.

After the display application is installed on the display device 230, the media content 234 corresponding to the hyperlink 212 may be streamed on the display application on the display device 230. For example, the mobile application 220 may transmit a set of launch parameters to the display application to retrieve the location of the media content, determine the display resolution or stream the media content using the appropriate video decoding protocol. The set of launch parameters may be display device-specific and may vary based on the specific type of display device 230 used to display the media content 234.

Figure 3:
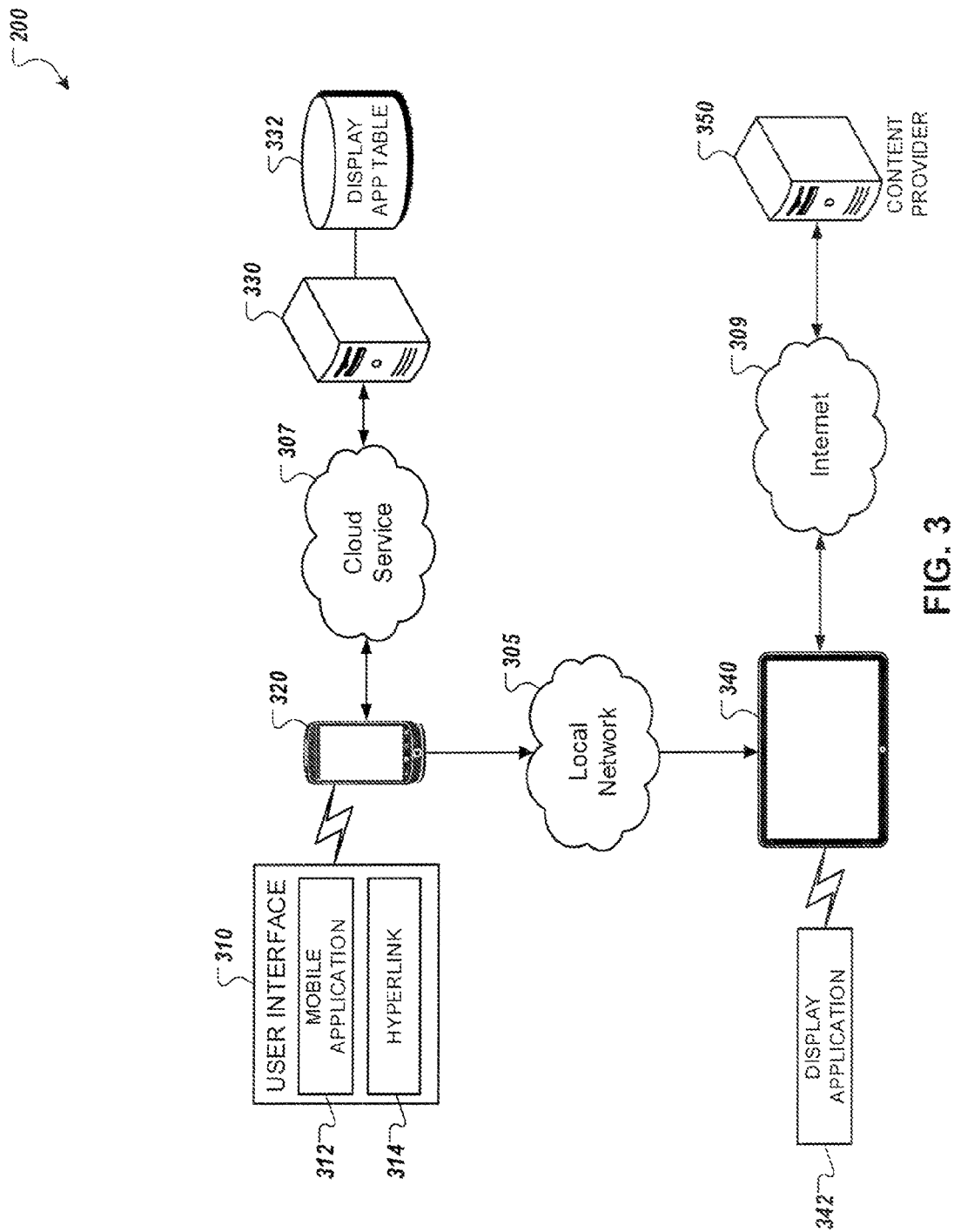
FIG. 3 illustrates an example system of a particular implementation used to direct content streaming using a hyperlink.

FIG. 3 illustrates an example system of one particular implementation that may be used to direct content streaming using a hyperlink. Briefly, the system 300 may include a user interface 310, a mobile device 320, a display device 340, and a content provider server 350. The system 300 also may include a local network 305 that may connect the mobile device 320 and the display device 340, a cloud service 307 that may connect the mobile device 320 and the display device 340 (connection not shown) to a cloud service on the server computer 330, and an Internet connection 309 that connects the display device 340 to a content provider 350.

In more detail, the mobile device 320 may be configured to run mobile applications. The mobile device 320 may receive user input through the user interface 310, which may be displayed through a mobile application 312 on the mobile device 320. In some instances, the user interface 310 may include a software plugin configured to process the hyperlink 314. The hyperlink 314 may be a hyperlink with embedded information that may include associated content and capable of using a deep linking technique to launch the mobile application 312 in response to being enabled by the user input on the user interface 310.

In some implementations, the software plugin of the mobile application 312 may be integrated into the mobile application 312 on the mobile device 320. In such implementations, the user may provide a user input on the user interface 310 over the hyperlink 314, which allows the user interface 310 to direct the hyperlink 314 to a separate network entity such as the cloud service 307 for further processing.

The local network 305 may be any type of network that connects the mobile device 320 and the display device 340 within a limited area such as a home, school, or office building. The local network 305 may include, for example, one or more of the Wide Area Networks (WANs), Local Area Networks (LANs), e.g., Wi-Fi, analog or digital wired and wireless telephone networks, e.g., a public switched telephone network (PSTN), Integrated Services Digital Network (IDSN), and Digital Subscriber Line (DSL), Ethernet, Internet protocol (IP) over broadband, radio, television, cable, satellite, Bluetooth, infrared or any other delivery or tunneling mechanism for carrying data. The local network 305 may include multiple networks or subnetworks, each of which may include, for example, a wired or wireless data pathway. The local network 305 may also include a circuit-switched network, a packet-switched data network, or any other network able to carry electronic communications (e.g., data or voice communications). The local network 305 may also be a wireless network, a broadband network, or a combination of networks including a wireless network and a broadband network.

The cloud service 307 may be any type of network that allows the mobile device 320 and the display device 340 to exchange communications with the server 330. In some implementations, the cloud service 307 may be placed within a local network such as, for example, the local area network 305. In other implementations, the cloud service 307 may be on a wide area network, such as, for example, the Internet 309.

The cloud service 307 may include, for example, one or more of the Internet, WANs, LANs, PSTN, IDSN, DSL, Ethernet, IP over broadband, radio, television, cable, satellite, or any other delivery or tunneling mechanism for carrying data. The cloud service 307 may also include a circuit-switched network, a packet-switched data network, or any other network able to carry electronic communications (e.g., data or voice communications). For example, the cloud service 307 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The cloud service 307 may include one or more networks that include wireless data channels and wireless voice channels. The cloud service 307 may also be a wireless network, a broadband network, or a combination of networks including a wireless network and a broadband network.

In some implementations, the cloud service 307 may enable data transmissions between one or more display devices 340 connected to the local network 305 and the server 330 over the cloud service 307 to determine one or display devices 340 that are capable to display media content associated with the hyperlink 314 on the mobile device 320 using a device identification technique, such as, for example, a discovery protocol available on the display device available on the one or more display devices 340 over the LAN such as SSDP, Googlecast, MDNS, UDAP, or Whisperplay. In other implementations, the cloud service 307 may enable data transmissions between the mobile device 320 and the sever 330 to exchange instructions related to designating one or more display devices connected to the local network 305 as devices to display media content associated with the hyperlink 314 on the mobile device 320.

The server 330 may be an electronic device configured to provide control services by exchanging electronic communications with the mobile device 320 over the network 305. In some implementations, the server 330 may host a cloud-based service configured to receive a URL request from the mobile device 320 over the network 305 after a user enables the hyperlink 314. The cloud-based service may index a display app table 332. The display app table 332 may include a list of compatible display applications that are capable of handling the received URL request from the hyperlink 314.

The display device 340 may be an output device for presentation of media content associated with the hyperlink 314 on the mobile device 330. For example, the display device 340 may be electronic visual displays such as televisions or computer monitors capable of connecting to the local network 305 and the Internet 309. The display device 340 may be connected to the mobile device 320 over the local network 305. The display device 340 receives data-plane content such as applications or the content associated with the hyperlink 314 for a distribution platform X. In some implementations, the display device 340 may additionally or alternatively include an external media player, for example, a video player, a media server, or a home theater PC, connected to the local network 305 that allows media content to be outputted on the display device 340.

Although not represented in FIG. 3, in some implementations, the display device 340 may be connected to the cloud service 307 to transmit hardware and device information about the display device 340 to enable the server 330 to determine an appropriate display from a list of candidate display devices connected to the local network 305 to display the content associated with the hyperlink 314. For example, one or more display devices 340 connected to the mobile device 320 over the local network 305 may transmit device attributes to the cloud service 307 such that the server 330 may designate appropriate display devices to display the content associated with the hyperlink 314. In response, the cloud service 307 may transmit the designation to the mobile device 320 for displaying the list of appropriate devices to the user for selection on the user interface 310.

The display device 340 may also include a display application 342 that is capable of displaying the media content associated with the hyperlink 314 by exchanging communications with one or more mobile applications on the mobile device 320. For example, the display device 340 may include a display application 342 capable of performing remote video streaming by receiving signal transmissions from the mobile application 312 on the mobile device over the local network 305. In such examples, the mobile application 312 on the mobile device 320 may use a software plugin to direct media content associated with the hyperlink 314 received on the mobile application 312 to be displayed on the display application 342 on the display device 340 after exchanging communications with the server 330 over the cloud service 307. For instance, the mobile application 312 may receive a set of video launch parameters from the server 330. The mobile application 312 may then use the launch parameters to initiate an app invocation process on the display device 340 to designate a display application 342 to display the media content associated with the hyperlink 314.

The display device 340 may be connected to the Internet 309 to exchange communications with the content provider 350. The Internet 309 may be a global system of interconnected computer networks that use a standard Internet protocol suite (TCP/IP). The content provider 309 may be a third-party server of any content publisher that contains information related to the application 342 or the content associated with the hyperlink 314. For example, in some instances, after the display device 340 receives an instruction to display the content associated with the hyperlink 314 from the mobile device 320, the display device 340 may transmit a request to download the corresponding content from the content provider 350 over the Internet 309. In another example, after the display device 340 receives an instruction to install a display application 342 that is not installed on the display device 340, the display device 340 may download the display application 342 from the content provider 350 over the Internet 309 and install the display application 342 on the display device 340. In both examples, the mobile device 320 communication control plane information related to either the associated content or the display application 342 such that the display device retrieves the corresponding data from the content provider 350.

In some implementations, the display device 340 may also receive the instructions to either install the display application 342 or display the content associated to the hyperlink 342 from the cloud service 307. In such implementations, the cloud service 307 transmits the instruction alternatively to the mobile device 320.

FIG. 4 illustrates example mobile and display applications that may be used to display media content through a hyperlink. For example, after a user enables a hyperlink 410 through a mobile application, a software plug in may send a URL request to the cloud service on a remote server that indexes a display app table 420. The display app table 420 may include a list of display applications on the display device 340 that may be used to display the media content associated with the hyperlink 410. For example, as indicated in FIG. 4, the display app table 420 may include a device display application, a name of the display application, video launch parameters, or a connection protocol used by the display device to interact with other media devices.

Figure 5:
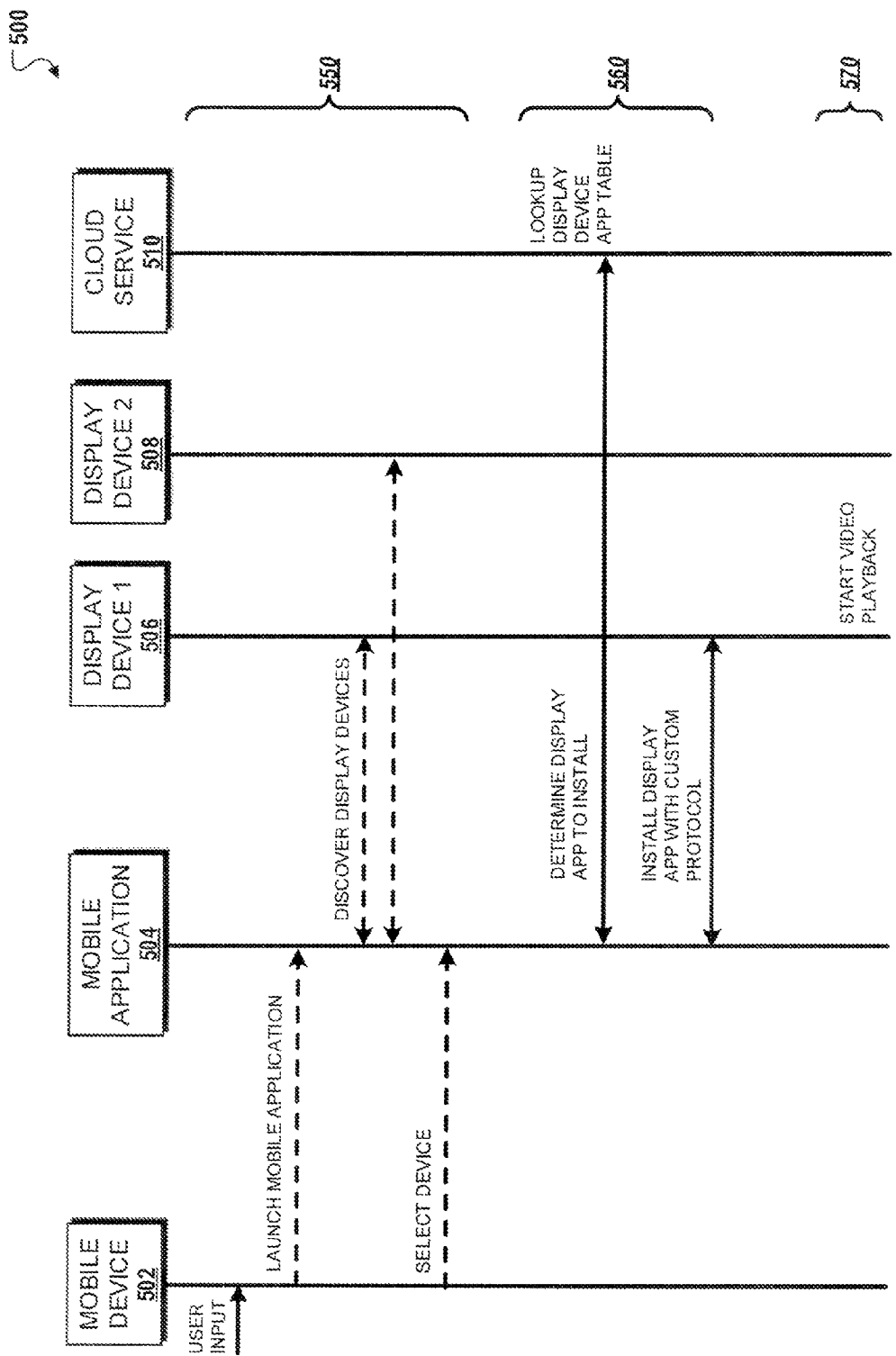
FIG. 5 is a swim lane diagram of the content streaming process of a particular embodiment using a hyperlink.

FIG. 5 is a swim lane diagram of a content streaming process 500 using a hyperlink. The process 500 may include a mobile device 502, a mobile application 504, one or more display devices 506, 508, and a cloud service 510. Although only display devices 506 and 508 are represented in the figure, the process 500 may include more display devices connected over the same local network as the mobile device 502. Communication between all devices throughout the process 500 may include a discovery phase (550), a selection phase (560), and a display phase (570).

The discovery phase (550) initially starts when a user provides a user input on the mobile device 502 to enable the hyperlink 314, which launches the mobile application 504 using common deeplinking techniques. The mobile application 504 may then identify one or more display devices 506 and 508 that may be connected to the same local network as the mobile device 502. For instance, the mobile device 502 may be connected to the same Wi-Fi network as a smart television or a media display device.

In one example, the mobile application 504 may determine the connected display devices 506 and 508 by using a multicast domain name system (mDNS) to determine the IP addresses of the one or more devices 506 and 508 on the local network. In such an example, the mobile application 504 may generate a list of device attributes and determine based on the generated list of attributes, the devices that may be display devices. In another example, the mobile application 504 may use a simple service discovery protocol (SSDP) or to determine the display devices that are connected over the local network of the mobile device 502.

In some implementations, the mobile application 504 may determine connected display devices by checking the user activity on the mobile device 502 to determine if the user has previously streamed any media content to a connected display device. In this example, the mobile application 504 utilizes user activity on one or more personal media accounts using a cloud history device to determine if the user has set up a connected display device on the account.

In some implementations, the cloud service 510 may determine connected display devices using the cloud device history resolver 114 as represented in FIG. 1. In such implementations, the cloud service 510 may use a history log of previously connected display devices over the local area network of the mobile device 502. In some instances, the cloud device history resolver 114 may categorize the display devices connected over different local area networks.

The selection phase (560) initially starts once the mobile application 504 has identified the one or more display devices 506 and 508 that are connected to the mobile device 502 over a local network. In response, the mobile application 504 may present a user interface to the user to select a display device from a list of connected display devices. The user interface may accept a user input from a user indicating a selection of a display device to display the content associated with the hyperlink 314. The mobile application 504 may then designate one of the display devices 506 or 508 as the selected display device to display the content associated with the hyperlink 314.

In some implementations, the mobile application 504 may also transmit a HTTP request to the cloud service 510 to determine the appropriate display application to launch the content associated with the hyperlink 314 on the selected display device. For instance, the cloud service 510 may compare the attributes of the selected display device to the display apps table 420 represented in FIG. 4. In such instances, the cloud service 510 may determine the video launch parameters by matching the selected display devices to the candidate display devices included within the display apps table 420. For example, as illustrated in FIG. 4, the cloud service 510 may compare the display device application, the application name, video parameters, and the app store protocol.

In some implementations, the cloud service 510 may determine the display application from the display apps table 420 based at least on the content provider of the content associated with the hyperlink 314. For example, if a display application of a content publisher is available for the selected display device, the cloud service 510 may direct the hyperlink 314 to the display application of the content publisher on the selected display device. In another example, the cloud service 510 may determine compatible display applications on the display device based on the attributes of the content associated with the hyperlink 314.

In some instances, after the cloud service 510 has determined an appropriate display application for the selected display device, the cloud service 510 may determine that the display application is not currently installed on the display device. In such instances, the cloud service 510 may install the display application on the selected display device. For example, the software plugin may utilize device-specific network and device protocols to install the display application on the selected display device. The cloud service 510 may determine the specific protocols to perform the installation using the identified display apps table 330.

The display phase (570) starts after the display application has been installed on the selected display device by the cloud service 510. Initially, the cloud service 510 may use a network protocol to launch the display application on the display device. For example, the cloud service 510 may use network protocols such as discovery and launch (DIAL), universal plug and play (UPnP), SSDP, or HTTP to invocate the display application on the display device. The cloud service 510 may then transmit a set of video launch parameters to the display application to decode and stream the content associated with the hyperlink 314. For example, the cloud service 510 may transmit a video resolution, a video codec, or playback control to display the associated content on the display device.

Figure 6A:
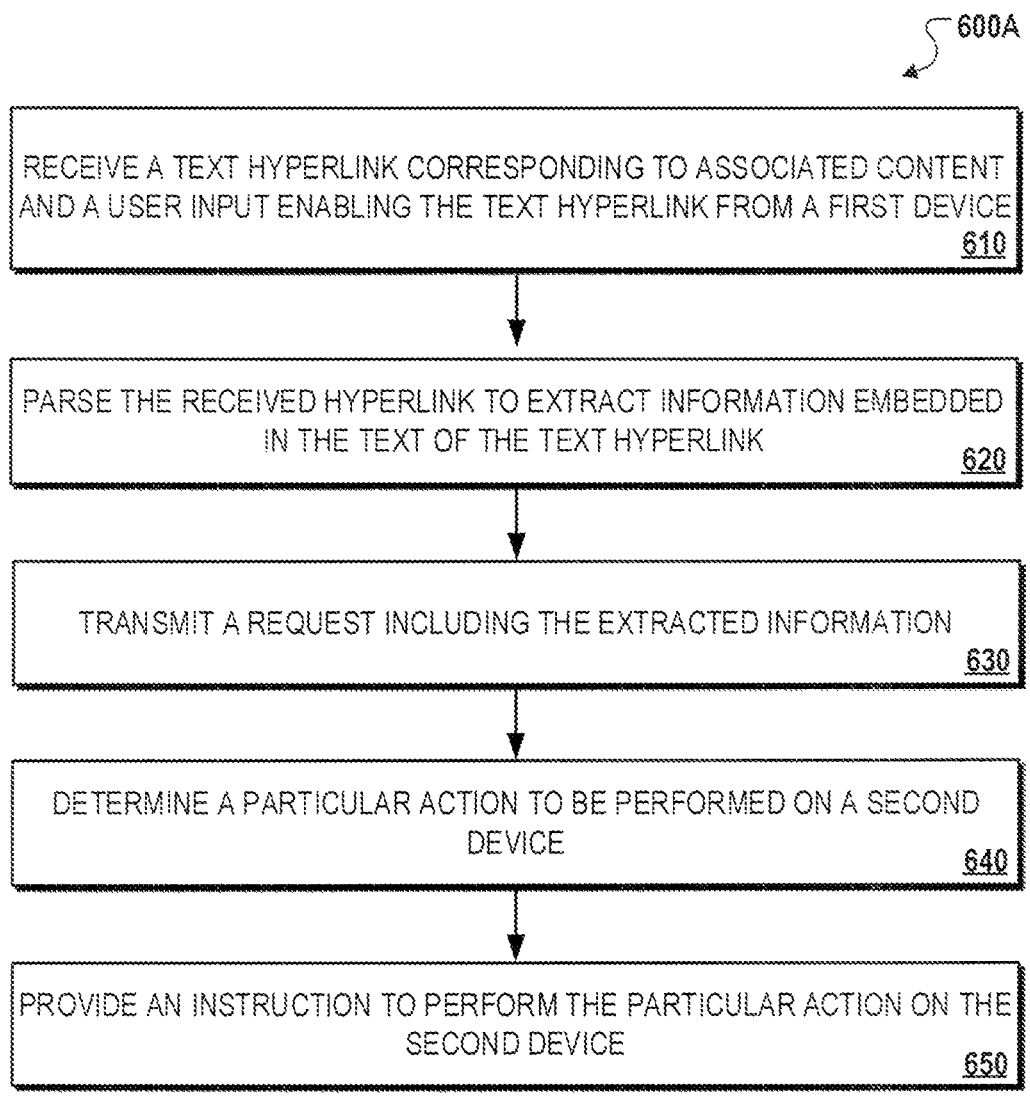
FIGS. 6A-6C are example processes for mobile-to-tv deeplinking.
Figure 6B:
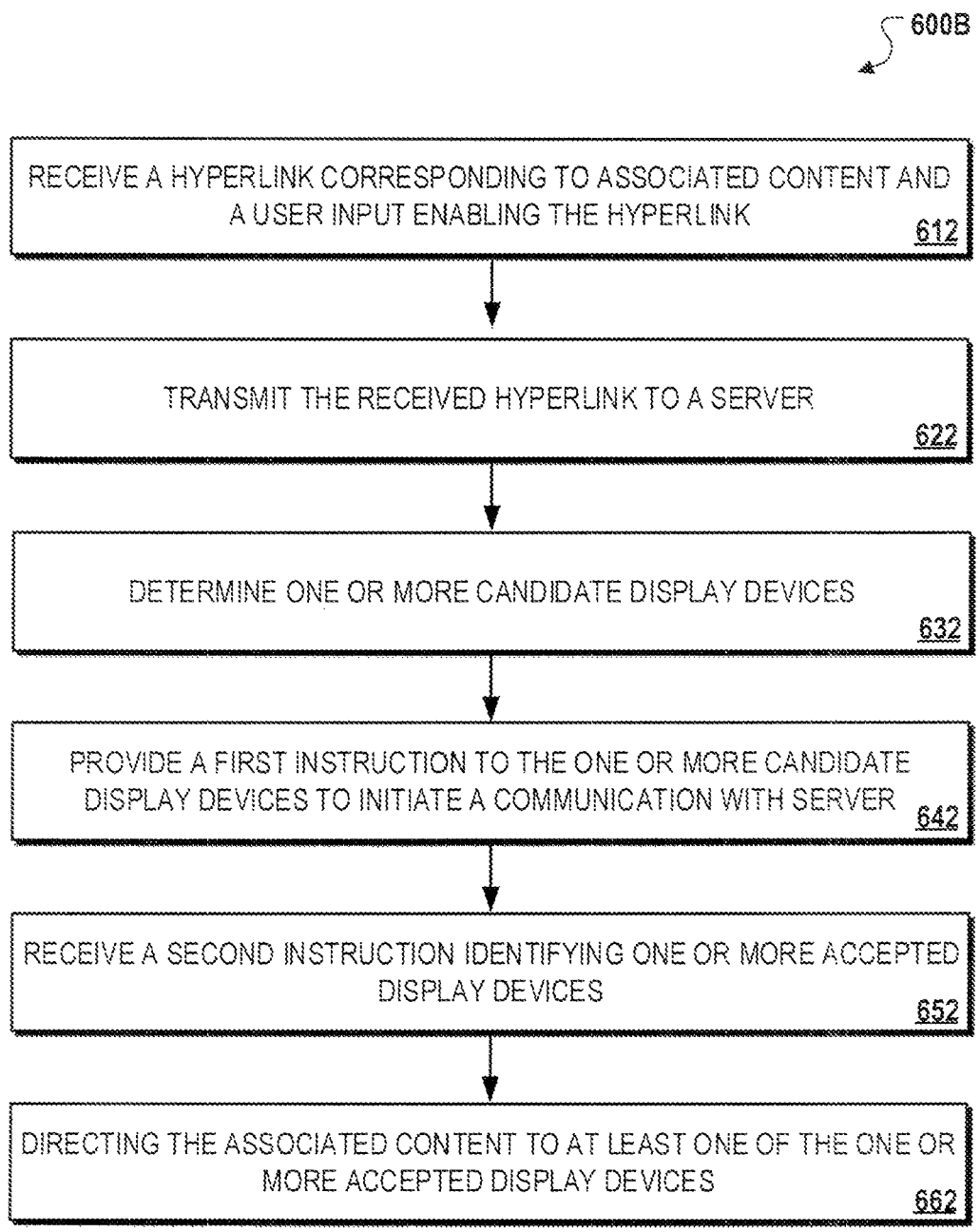
Figure 6C:
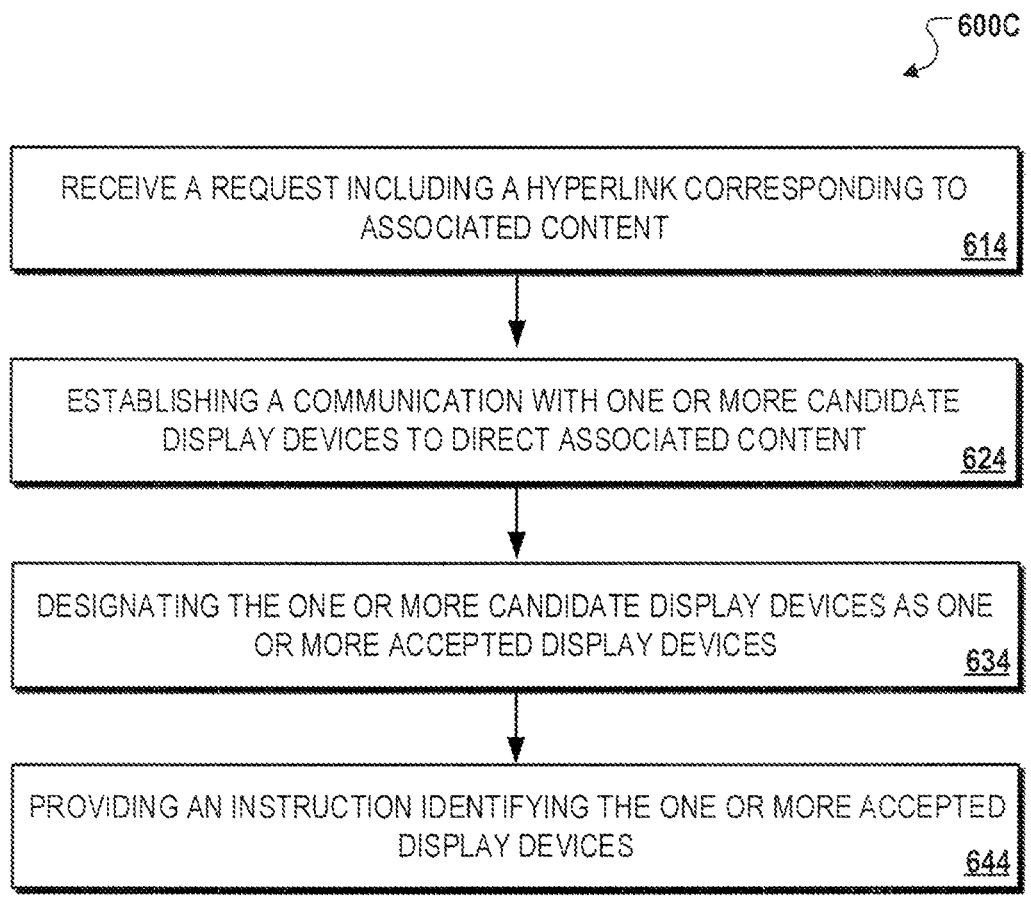

FIGS. 6A-6C are example processes for performing actions using a hyperlink. Generally, FIG. 6A represents an example process 600A that may be used to perform a particular action on a second device based on receiving a hyperlink on a first device. FIG. 6B represents an example process 600B that may be used by one implementation to direct content associated with the hyperlink from a mobile device to a display device. FIG. 6C represents an example process 600C that may be used by a server of one implementation to designate one or more candidate display devices as accepted display devices to display associated content.

Referring to FIG. 6A, the process 600A may include receiving a hyperlink corresponding to associated content and a user input enabling the hyperlink from a first device (610), parsing the received hyperlink to extract information embedded in the text of the hyperlink (620), transmitting a request including the extracted information (630), determining a particular action to be performed on a second device (640), and providing an instruction to perform the particular action on the second device (650).

Referring to FIG. 6B, the process 600B may include receiving a hyperlink with associated content and a user input enabling the hyperlink (612), transmitting the received hyperlink to a server (622), determining one or more candidate display devices (632), providing a first instruction to the one or more candidate display devices to initiate a communication with the server (642), receiving a second instruction identifying one or more accepted display devices (652), and directing the associated content to at least one of the one or more accepted display devices (662).

Referring to FIG. 6C, the process 600C may include receiving a request including a hyperlink corresponding to associated content (614), establishing a communication with one or more candidate display devices to direct the associated content (624), designating the one or more candidate display devices as one or more accepted display devices (634), and providing an instruction identifying the one or more accepted display devices (644).

In more detail, the process 600A may include receiving a hyperlink corresponding to associated content and a user input enabling the hyperlink from a first device (610). For example, the mobile device 120 may receive the hyperlink 102 and a user input enabling the hyperlink through a user interface on the mobile device 120. In addition, the link distributor 104 may then register the hyperlink 102 as being enabled and perform a deep linking into a mobile application on the mobile device 320. In some instances, starting the mobile application may also invoke the client resolution manager 122.

The process 600A may include parsing the received hyperlink to extract information embedded in the text of the hyperlink (620). For example, the client resolution manager 122 may pass the hyperlink 102 to the client properties resolver 212, which may parse the link and extract information embedded in the text of the hyperlink 102. In some instances, the information may be static information such as, but not limited to, access codes for user authentication, metadata for video content associated to the hyperlink 102, promotional details related to advertising content associated with the hyperlink 102, additional or supplementary media content that is associated with the hyperlink 102, time restrictions for enabling or disabling content associated with the hyperlink 102. In addition, the client resolution manager 22 may search a local database for display device types and compatible applications that may meet specifications in the hyperlink 102.

The process 600A may include transmitting a request including the extracted information (630). For example, the client properties resolver 124 may exchange communications with the cloud properties resolver 112 and transmit the request including the extracted information of the hyperlink 102 to the cloud service 110. In some instances, this exchange may enable the cloud service 110 to perform additional run-time checks, such as information regarding displaying the associated content dynamically, including, but not limited to, overrides of static information embedded within the text of the hyperlink 102, or the number of remaining times the associated content may be played with particular authorization codes embedded within the link.

The cloud properties resolver 224 may also maintain a database of media metadata that may include, for example, display device and display application types, or checks for compatibility of the associated content with the display device and display application types. In some instances if the cloud service 110 may determine, based on the request transmitted by the client properties resolver 124, if the associated content may be displayed on display devices 230 that share a local area network connection with the mobile device 120. In response, the cloud properties resolver 112 may transmit a signal to the client properties resolver 124 with an indication that process may continue. The client properties resolver 124 may then transmit the specifications of the display devices 230, the extracted information from the text of the hyperlink 102, or additional information generated by the cloud properties resolver 112 to the client available devices resolver 126.

The client available devices resolver 126 may search for display devices 230 that share a network connection with the mobile device 120. The client available devices resolver 126 may also determine which of the display devices 230 meets the requirements determined by the combination of the cloud properties resolver 112 and the client properties resolver 124. The client available devices resolver may perform a local search for display devices by broadcasting a request over a variety of communication mediums including, but not limited to Wi-Fi, Bluetooth, infrared, Ethernet, IP, which may be detected by the discovery module 136 of the display device 130. In response, the discover module 236 may transmit a signal to the client available devices resolver 126 with an indication that the display device 130 of the device status. The client available devices resolver 126 may also transmit the list of display devices 230 to the cloud device history resolver 114, which may keep a historical record of the display devices 230 that are connected over a network with the mobile device 120. The client available devices resolver 126 may then designate some of the display devices 230 as accepted display devices based on the attributes of the display devices 230, the information embedded in the text of the hyperlink 102, or the attributes of the content associated with the hyperlink 102. The client devices resolver 226 may then transmit the list of accepted display devices to the action decision logic 128.

The process 600A may include determining a particular action to be performed on a second device (640). For example, the action decision logic 128 may determine a particular action to be performed on the display device 130. For instance, the action decision logic 128 may initially determine the particular action to be performed on the display device 130 based on the device attributes of the display device 130, the type of content associated with the hyperlink 102, or the information embedded within the text of the hyperlink 102.

The process 600A may include providing an instruction to perform the particular action on the second device (650). For example, the action decision logic 128 may provide a set of instructions to the app actions 132 or the device actions 134 to perform a particular action on the display device 130. In some instances, the action decision logic 128 may instruct the device action logic to play a video using a web-based video player on the display device 234. In other instances, the device actions logic 228 may query a set of instructions device actions 134 on the display device 130 such as determining if a particular display application that is needed to stream the content associated with the hyperlink 102 exists on the display device 130. In response to determining that the display application does not exist, the action decision logic 128 may transmit an instruction the device actions 134 to initiate the installation of the display application.

The action decision logic 128 may also transmit an instruction to perform the particular action to the app actions 132. In some instances, when the action decision logic 128 establishes a connection with the app actions 132, a computer-implemented process may be invoked on a display application on the display device 130. For example, the action decision logic 128 may transmit an instruction to the app actions 132 that may include loading a video streaming application installed on the display device 130 to display the content associated with the hyperlink 102.

In some other instances, the action decision logic 128 may also utilize the cloud action relay 118 to assist the performance of the particular action on the display device 130. For example, the cloud action relay 118 may transmit messages between the action decision logic 128 and the app actions 132, or filter communications between the action decision logic 128 and the app actions 132 to perform a variety of actions include, but not limited to, streaming media on the display device 130, authenticating a user, displaying promotional materials on the display device 130, or controlling the use of the display device 130.

Referring now to FIG. 6B, the process 600B may initially include receiving a hyperlink with associated content and a user input enabling the hyperlink (612). For example, the user interface 310 may display a hyperlink 314 that references associated content using a hypertext transfer protocol (HTTP). The hyperlink may enable a user accessing the user interface 310 to view the media content associated with the hyperlink 314. The associated content may be a media file such as video or a photo located on the remote server 330, or a display application 342 to be installed on the display device 340.

The process 600B may transmitting the received hyperlink to a server (622). For example, the mobile application 312 on the mobile device 320 may transmit a HTTP request that may include the hyperlink 314 and a list of connected display devices 340 over the local network 305 to the server 330 using the cloud service 307. In one instance, a software plugin may be integrated into a mobile application on the mobile device 320.

The process 600B may include determining one or more candidate display devices (632). For example, in one instance, the server 330 may determine the types of one or more candidate display devices to direct the associated content of the hyperlink 314 after receiving a HTTP request from the mobile application 312 that identifies one or more display devices 340 that are connected to the mobile device 312 over the local network 305. In another instance, the mobile application 312 may determine the types of one or more candidate display devices based on exchanging communications with the one or more display devices 340 over the local network 305. In both instances, the one or more candidate display devices may be identified based at least on the attributes of the one or more display devices such as operating system, video rendering capabilities, display applications, connection protocols, network protocols, device discovery protocols, among other things.

The process 600B may include providing a first instruction to the one or more candidate display devices to initiate a communication with the server (642). For example, the mobile application 312 may initiate a communication bridge between the one or more display devices 340 identified as candidate display devices and the server 330 through the cloud service 307. In one instance, the mobile application 312 may be configured to be used as a network interface for exchanging data transmissions between the server 330 and the one or more display devices 340 identified as candidate display devices. In such an instance, the mobile application 312 may initially transmit a signal to the one or more display devices identified as candidate display devices to initiate a connection protocol with the mobile device 320 over the local network 305. The mobile application 312 may subsequently initiate a communication protocol with the server 330 over the cloud service 307. The one or more display devices 340 display devices identified as candidate display devices may then exchange communications with the server 330 using the mobile device 320 as a network bridge.

The process 600B may include receiving a second instruction identifying one or more accepted display devices (652). For example, the server 330 may initially designate the one or more candidate display devices as one or more acceptable display devices based on determining which of the candidate display devices is capable of displaying the content associated with the hyperlink 314. For instance, the server 330 may use the display app table 332 to determine if the candidate display device has a compatible display application 342 to display the associated content. In another instance, the server 330 may analyze the performance of the associated content on the candidate display device by comparing the hardware of the candidate display device and the video launch parameters of the associated content such as native video resolution, frame rate, and stream bandwidth requirements.

The process 600B may include directing the associated content to at least one of the one or more accepted display devices (662). For example, the server 330 may designate the one or more candidate display devices as accepted display devices that may be capable of directing the content associated with the hyperlink 314. The server may then use a device-specific protocol to control a display application 342 on the display device 340. The server 330 may then transmit a set of launch parameters to enable the display application 342 to display the media content associated with the hyperlink 314.

In some implementations, the server 330 may determine more than one accepted display devices connected to the local network 305 to display the content associated with the hyperlink 314. For example, the server 330 may determine that two display devices 340 connected to the mobile device 312 over the local network 305 may be capable of displaying the content associated with the hyperlink 314. In such examples, the server 330 may transmit the list of accepted display devices to the mobile application 312 to display a list of accepted display devices on the user interface 310. A user may initially choose a particular accepted display device from the list of the devices on the user interface to direct the content associated with the hyperlink 314. In response, the mobile application 312 may transmit a signal to the server 330 with the user indication and direct the associated content to the user-selected accepted display device.

Referring now to FIG. 6C, the process 600C may include receiving a request including a hyperlink corresponding to associated content (614). For example, the server 330 may receive a HTTP request associated with the hyperlink 314 from the mobile application 312.

The process 600C may include establishing a communication with one or more candidate display devices to direct associated content (624). For example, the mobile application 312 may initiate a communication bridge between the one or more display devices 340 identified as candidate display devices and the server 330 through the cloud service 307. In one instance, the mobile application 312 may be configured to be used as a network interface for exchanging data transmissions between the server 330 and the one or more display devices 340 identified as candidate display devices. In such an instance, the mobile application 312 may initially transmit a signal to the one or more display devices identified as candidate display devices to initiate a connection protocol with the mobile device 320 over the local network 305. The mobile application 312 may subsequently initiate a communication protocol with the server 330 over the cloud service 307. The one or more display devices 340 display devices identified as candidate display devices may then exchange communications with the server 330 using the mobile device 320 as a network bridge.

The process 600C may include designating the one or more candidate display devices as one or more accepted display devices (634). For example, the server 330 may initially designate the one or more candidate display devices as one or more acceptable display devices based on determining which of the candidate display devices is capable of displaying the content associated with the hyperlink 314. For instance, the server 330 may use the display app table 332 to determine if the candidate display device has a compatible display application 342 to display the associated content. In another instance, the server 330 may analyze the performance of the associated content on the candidate display device by comparing the hardware of the candidate display device and the video launch parameters of the associated content such as native video resolution, frame rate, and stream bandwidth requirements.

The process 600C may include providing an instruction identifying the one or more accepted display devices (644). For example, the server 330 may designate the one or more candidate display devices as accepted display devices that may be capable of directing the content associated with the hyperlink 314. The server may then use a device-specific protocol to control a display application 342 on the display device 340. The server 330 may then transmit a set of launch parameters to enable the display application 342 to display the media content associated with the hyperlink 314.

Figure 7:
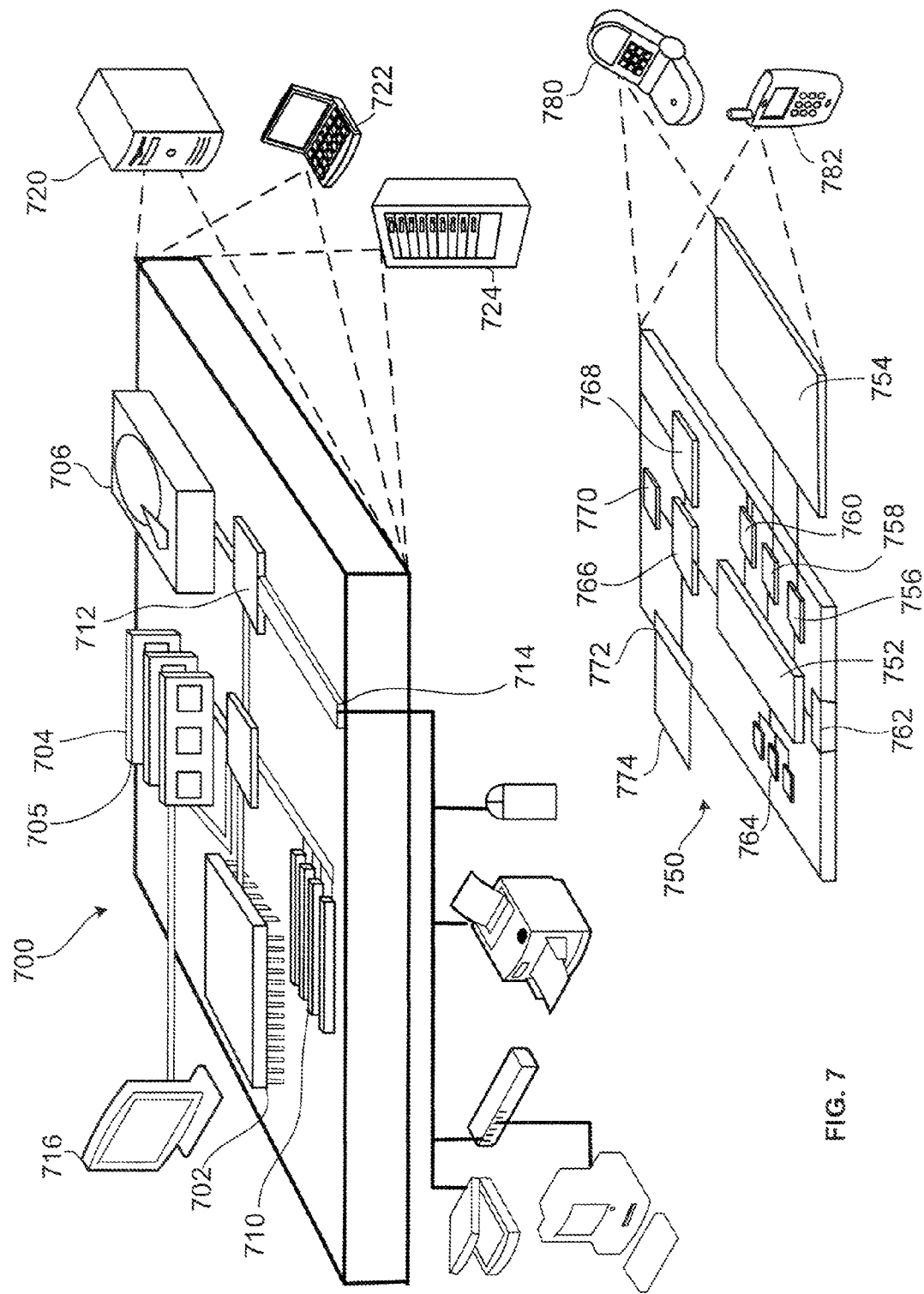
FIG. 7 is a block diagram of computing devices on which the processes described herein, or potions thereof, may be implemented.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 700 may include a processor 702, memory 704, a storage device 706, a high-speed interface 608 connecting to memory 704 and high-speed expansion ports 710, and a low speed interface 712 connecting to low speed bus 714 and storage device 706. Each of the components 702, 704, 706, 608, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 co-hyperlinked to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth intensive operations. Such allocation of functions is exemplary only. In one implementation, the high-speed controller 708 is co-hyperlinked to memory 704, display 716 (e.g., through a graphics processor or accelerator), and to high-speed expansion ports 710, which may accept various expansion cards (not shown). In the implementation, low-speed controller 712 is co-hyperlinked to storage device 706 and low-speed expansion port 414. The low-speed expansion port, which may include various communication ports (e.g., USB, Bluetooth, Ethernet, wireless Ethernet) may be co-hyperlinked to one or more input/output devices, such as a keyboard, a pointing device, microphone/speaker pair, a scanner, or a networking device such as a switch or router, e.g., through a network adapter. The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 may include a processor 752, memory 764, and an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 710 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 co-hyperlinked to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation—and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, co-hyperlinked to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that may include a back end component (e.g., as a data server), or that may include a middleware component (e.g., an application server), or that may include a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   receiving, from a first device, data indicating (i) a hyperlink corresponding to associated content, and (ii) a user input on the first device enabling the hyperlink;
   in response to receiving the data indicating the user input on the first device enabling the hyperlink, parsing the received hyperlink to extract information embedded in the text of the hyperlink;
   determining, based at least on (i) the extracted information embedded in the text of the hyperlink, and (ii) the associated content corresponding to the hyperlink, a particular action to be performed on a second device wherein the link action parameters include a link action parameter that specifies a particular sequence of actions to be performed by the application installed on the second device; and
      providing, to the second device, an instruction to perform the particular action on the second device, wherein:
      the instruction (i) configures the second device to establish bi-directional communications with the first device, and (ii) is dynamically adapted to a control plane protocol of the second device, and
      the particular action is configured to (i) be viewable to a user providing the user input on the first device, and (ii) operate in a control plane of the second device without interfering with data plane traffic on the second device;
   obtaining, from the second device, data indicating that the particular action has been performed on the second device; and
   providing, to the first device, data indicating present status associated with the second device based on obtaining the data indicating that the particular action has been performed on the second device.

2. The method of claim 1, wherein the first device is a mobile computing device and the second device is a display device.

3. The method of claim 2, wherein performing the particular action to be performed on the second device comprises displaying the associated content on the screen of the second device.

4. The method of claim 2, wherein performing the particular action to be performed on the second device comprises installing software on the second device that is necessary to display the associated content on the screen of the second device.

5. The method of claim 4, wherein after installing software on the second device to display the associated content on the display of the second device, displaying the associated content on the screen of the second device.

6. The method of claim 5, wherein the hyperlink may include promotional information from a content publisher, the promotional information containing at least one of a content discount, a share-with-friends feature, or an access to other links with additional features.

7. The method of claim 4, comprising:
   Restricting access to performing the particular action based at least on the instruction.

8. The method of claim 7, wherein restricting access to performing the particular action comprises providing a method of authentication for a user providing an input to enable the hyperlink.

9. The method of claim 7, wherein restricting access to performing the particular action comprises designating the second device as a permitted device that may perform the particular action to be performed.

10. The method of claim 7, wherein restricting access performing to the particular action comprises:
    designating the first device as a permitted device that may transmit the instruction to the second device; or
    designating a user of the first device as a permitted user that may transmit the instruction to the second device.

11. The method of claim 7, wherein restricting access to performing the particular action comprises designating a time period only when the particular action to be performed is performed.

12. The method of claim 7, wherein restricting access to performing the particular action comprises limiting the number of times the particular action to be performed is performed.

13. The method of claim 1, comprising transmitting, to a server computer, a request including the extracted information embedded in the text of the hyperlink.

14. The method of claim 1, wherein operating in the control plane comprises performing a particular action, on a cloud network, configured to operate where the physical transfer of the associated content and any related constraints such as security, monitoring, content quality, can be adhered to as if transferring the content associated was initiated from the second device without the first device.

15. The method of claim 1, wherein the text of the hyperlink comprises an instruction to either (i) direct the particular action to be performed on the second device, or (ii) restrict the particular action to be performed on the second device.

16. The method of claim 15, wherein the instruction is statically embedded in the text of the hyperlink.

17. The method of claim 15, wherein the instruction is generated in response to receiving the user input enabling the hyperlink, wherein the instruction initiates an intermediate particular action performed before the particular action to be performed that either (i) directs the particular action to be performed on the second device, or (ii) restricts the particular action to be performed on the second device.

18. The method of claim 17, wherein the intermediate action is executed on a server connected to a wide area network.

19. The method of claim 17, wherein the intermediate action is executed on the first device.

20. The method of claim 1, wherein the first device and the second device are both observable to the user.

21. The method of claim 1, wherein the first device and the second device are connected over a wireless or wired local area network.

22. The method of claim 1, wherein the first device and the second device are connected to the Internet, the second device remote from the first device.

23. The method of claim 1, wherein the hyperlink is displayed to the user in at least one of a document, an online advertisement, or a paper advertisement.

24. The method claim 1, wherein the hyperlink is embedded in an email.

25. The method of claim 1, wherein the hyperlink is embedded in a webpage.

26. The method of claim 1, wherein the hyperlink is embedded in a mobile application.

27. The method of claim 1, wherein the hyperlink is displayed to the user as a bar code.

28. The method of claim 1, wherein the instruction configures an application installed on the second device to exchange, over a local network, communications with an application installed on the first device.

29. The method of claim 1, further comprising:
obtaining, from the second device, data indicating that the second device is presently displaying the associated content on a screen of the second device; and
providing, to the first device, an instruction to display metadata related to the associated content based on obtaining the data indicating that the second device is presently displaying the associated content.

30. The method of claim 1, wherein the information embedded in the text of the hyperlink specifies one or more link action parameters that configure execution of an application installed on the second device.

31. A system comprising:
one or more computers; and
a non-transitory computer-readable medium coupled to the one or more computers having instructions stored thereon, which, when executed by the one or more computers, cause the one or more computers to perform operations comprising:
receiving, from a first device, data indicating (i) a hyperlink corresponding to associated content, and (ii) a user input on the first device enabling the hyperlink;
in response to receiving the data indicating the user input on the first device enabling the hyperlink, parsing the received hyperlink to extract information embedded in the text of the hyperlink;
determining, based at least on (i) the extracted information embedded in the text of the hyperlink, and (ii) the associated content corresponding to the hyperlink, a particular action to be performed on a second device wherein the link action parameters include a link action parameter that specifies a particular sequence of actions to be performed by the application installed on the second device; and
providing, to the second device, an instruction to perform the particular action on the second device, wherein:
the instruction configures the second device to establish bi-directional communications with the first device, and
the particular action is configured to (i) be viewable to a user providing the user input on the first device, and (ii) operate in a control plane of the second device without interfering with data plane traffic on the second device;
obtaining, from the second device, data indicating that the particular action has been performed on the second device; and
providing, to the first device, data indicating present status associated with the second device based on obtaining the data indicating that the particular action has been performed on the second device.

32. The system of claim 31, wherein the first device is a mobile computing device and the second device is a display device.

33. The system of claim 32, wherein operating in the control plane comprises performing a particular action, on a cloud network, configured to operate where the physical transfer of the associated content and any related constraints such as security, monitoring, content quality, can be adhered to as if transferring the content associated was initiated from the second device without the first device.

34. The system of claim 33, wherein performing the particular action to be performed on the second device comprises displaying the associated content on the screen of the second device.

35. The system of claim 33, wherein performing the particular action to be performed on the second device comprises installing software on the second device that is necessary to display the associated content on the screen of the second device.

36. The system of claim 35, wherein after installing software on the second device to display the associated content on the display of the second device, displaying the associated content on the screen of the second device.

37. The system of claim 36, wherein the instruction is statically embedded in the text of the hyperlink.

38. The system of claim 37, wherein the intermediate action is executed on a server connected to a wide area network.

39. The system of claim 37, wherein the intermediate action is stored on the first device.

40. The system of claim 36, wherein the instruction is generated in response to receiving the user input enabling the hyperlink, wherein the instruction initiates an intermediate particular action performed before the particular action to be performed that either (i) directs the particular action to be performed on the second device, or (ii) restricts the particular action to be performed on the second device.

41. The system of claim 36, wherein the hyperlink may include promotional information from a content publisher, the promotional information containing at least one of a content discount, a share-with-friends feature, or an access to other links with additional features.

42. The system of claim 35, wherein the text of the hyperlink comprises an instruction to either (i) direct the particular action to be performed on the second device, or (ii) restrict the particular action to be performed on the second device.

43. The system of claim 31, comprising transmitting, to a server computer, a request including the extracted information embedded in the text of the hyperlink transmitting, to a server computer, a request including the extracted information embedded in the text of the hyperlink.

44. The system of claim 31, wherein the first device and the second device are both observable to the user.

45. The system of claim 31, wherein the first device and the second device are connected over a wireless or wired local area network.

46. The system of claim 31, wherein the first device and the second device are connected to the Internet, the second device remote from the first device.

47. The system of claim 31, comprising:
restricting access to performing the particular action based at least on the instruction.

48. The system of claim 47, wherein restricting access to performing the particular action comprises a providing a method of authentication for a user providing an input to enable the hyperlink.

49. The system of claim 47, wherein restricting access performing to the particular action comprises designating the second device as a permitted device that may perform the particular action to be performed.

50. The system of claim 47, wherein restricting access to performing the particular action comprises:
designating the first device as a permitted device that may transmit the instruction to the second device; or
designating a user of the first device as a permitted user that may transmit the instruction to the second device.

51. The system of claim 47, wherein restricting access to performing the particular action comprises designating a time period only when the particular action to be performed is performed.

52. The system of claim 47, wherein restricting access to performing the particular action comprises limiting the number of times the particular action to be performed is performed.

53. The system of claim 31, wherein the hyperlink is displayed to the user in at least one of a document, an online advertisement, or a paper advertisement.

54. The method claim 31, wherein the hyperlink is embedded in an email.

55. The method of claim 31, wherein the hyperlink is embedded in a webpage.

56. The method of claim 31, wherein the hyperlink is embedded in a mobile application.

57. The method of claim 31, wherein the hyperlink is displayed to the user as a bar code.

* * * * *